United States Patent [19]

Jones

[11] Patent Number: 4,876,906

[45] Date of Patent: Oct. 31, 1989

[54] NON-JAMMING ACTUATOR SYSTEM

[75] Inventor: Teddy L. Jones, Cherry Valley, Ill.

[73] Assignee: Sundstrand Corporation, Rockford, Ill.

[21] Appl. No.: 932,878

[22] Filed: Nov. 20, 1986

[51] Int. Cl.$^4$ .................................. B64C 13/42
[52] U.S. Cl. ..................... 74/89.15; 74/424.8 R; 244/75 R; 244/78
[58] Field of Search ............... 74/593, 412 TA, 89.15, 74/424.8 R; 244/75 R, 78

[56] References Cited

U.S. PATENT DOCUMENTS

| | | | |
|---|---|---|---|
| 2,664,255 | 12/1953 | Crandall et al. ................... | 244/227 |
| 2,830,562 | 4/1958 | Hogan ................................. | 91/374 |
| 2,970,574 | 2/1961 | Geyer ................................. | 267/126 |
| 3,011,654 | 12/1961 | Cannon et al. ..................... | 74/584 |
| 3,732,783 | 5/1973 | Emenaker ........................... | 91/44 |
| 3,824,905 | 7/1974 | Jablonsky ........................... | 92/136 |
| 4,179,944 | 12/1979 | Conner ................................ | 74/89.15 |
| 4,191,280 | 3/1980 | Copperwheat ..................... | 188/300 |
| 4,240,334 | 12/1980 | Crosser .............................. | 92/23 |
| 4,241,814 | 12/1980 | Masclet .............................. | 188/266 |
| 4,481,864 | 11/1984 | Peruzzi .............................. | 91/44 |
| 4,497,215 | 2/1985 | Gronbedh et al. ................. | 74/89.15 |
| 4,509,408 | 4/1985 | Kuroda .............................. | 92/2 |
| 4,530,271 | 7/1985 | Cronin .............................. | 91/509 |

FOREIGN PATENT DOCUMENTS 0861886 1/1953 Fed. Rep. of Germany .......... 74/99
0221240 11/1985 Japan ............................. 74/424.8 R

OTHER PUBLICATIONS

"Mechanisms, Linkages and Mechanical Controls;" Ball Bearing Screws; editor: N.P. Chironis; 1965 McGraw-Hill; pp. 58-60.

Primary Examiner—Leslie A. Braun
Assistant Examiner—Scott Anchell
Attorney, Agent, or Firm—Wood, Dalton, Phillips, Mason & Rowe

[57] ABSTRACT

A non-jamming electro-mechanical hydrostatic actuator system includes one embodiment in which a ballscrew assembly has a rotatable nut and an axially movable ballscrew. A motor rotates the nut to axially move the ballscrew. An actuator is operatively connected to a load to be actuated. A hydraulic system is coupled between the ballscrew and the actuator and includes a closed hydraulic circuit for statically trapping fluid in the circuit to effect movement of the actuator in response to movement of the ballscrew. The closed circuit is selectively opened to allow fluid flow in the circuit in the event of failure or jamming of the ballscrew assembly to allow reaction movement of the actuator in response to load forces. In another embodiment a rotary vaned assembly includes a cylinder housing a rotary vane, with the motor rotating the cylinder. The hydraulic system is coupled between the cylinder and the vane and includes a closed hydraulic circuit for statically trapping fluid in the circuit on opposite sides of the vane to effect conjoint rotation of the cylinder and the van. When the closed circuit is opened to allow fluid flow in the circuit the vane can rotate independently of the cylinder to allow reaction movement of the actuator in response to load forces.

9 Claims, 4 Drawing Sheets

NON-JAMMING ACTUATOR SYSTEM

CROSS-REFERENCE TO RELATED APPLICATION

This application is related to but in no way dependent upon copending application Serial No. 939,407, filed Dec. 8, 1986, herewith.

BACKGROUND OF THE INVENTION

It has been recognized, especially in the actuation or control of aircraft primary flight control surfaces, that failure modes which result in the surface being jammed can cause a flight safety problem. System failures, such as a loss of voltage or extremely high voltage, could cause a command signal to actuate the control surface to an extreme position which also would result in a critical flight safety situation. Actuators move or control such control surfaces as rudders, horizontal stabilizers, ailerons, and the like.

Traditionally, flight control systems for commercial and military aircraft primarily have employed hydromechanical actuation systems due to the reliable, non-jamming high response characteristics of hydraulic cylinders. Advancements in electronics and the development of rare earth permanent magnet brushless DC motors, with their characteristic high torque to inertia ratio, have led the trend toward digital fly-by-wire flight control systems controlled by computers versus the traditional hydraulic modes. The advantages of such advanced fly-by-wire flight control systems include reduced weight and maintenance due to the elimination of fluid plumbing throughout the aircraft, and active flight control for stability augmentation and ride quality enhancement.

However, the advanced electromechanical actuation systems use geared rotary or linear ballscrew or Acme threaded actuators which often are considered unacceptable for many applications due to failure conditions where the system can jam in a fixed position which results in a jammed control surface. Of course, jamming is of critical importance because of the safety problem involving loss of control of the aircraft.

This invention is directed to solving the above problems by combining the advantages of electromechanical actuation system fly-by-wire technology with a reliable, non-jamming, high response feature incorporated in the system. The invention contemplates an electromechanical hydrostatic actuator that is a significant improvement over existing pure hydraulic systems or electromechanical systems.

SUMMARY OF THE INVENTION

An object, therefore, of the invention is to provide a new and improved, non-jamming actuator system of the character described for use in a wide range of applications, including actuation of control surfaces in aircraft.

In one exemplary embodiment of the invention, the non-jamming electro-mechanical hydrostatic actuator system includes a ballscrew assembly including a rotatable nut and a linearly movable ballscrew. Generally, actuator means are operatively associated with a load to be actuated. Hydraulic means are coupled between the ballscrew and the actuator means. The hydraulic means include a closed hydraulic circuit having means for statically trapping fluid in the circuit to effect movement of the actuator means in response to movement of the ballscrew and, thereby, comprise the driving link for moving the actuator means; and for selectively allowing fluid flow in the circuit in the event of failure or jamming of the ballscrew assembly and, thereby, allow movement of the actuator means in response to load forces.

As disclosed herein, the hydraulic means include a double-acting piston and cylinder device with the closed circuit communicating between opposite sides of the piston. The ballscrew forms the cylinder and the actuator means is operatively connected to the piston, whereby when the closed circuit is in static condition, the ballscrew, the piston and the actuator means move linearly as a unit. In the event of ballscrew jamming or system failure, the closed circuit is opened to allow the piston and actuator means to move relative to the ballscrew (or cylinder) in response to load forces.

Another feature of the invention is to provide position indicator means operatively associated between the ballscrew-cylinder and the piston-actuator means.

In another embodiment of the invention, the non-jamming actuator system is a rotary system and includes a rotary vaned assembly including cylinder means housing a rotary vane. Drive means are provided for rotating the cylinder means. Actuator means are operatively associated with a load to be actuated, the actuator means being coupled to the rotary vane. As with the first embodiment, a closed hydraulic circuit, including selectively operable valve means, communicates with the cylinder but on opposite sides of the rotary vane. Therefore, a closed condition of the valve means traps fluid in the circuit to effect movement of the actuator means in response to rotation of the cylinder means, and an open condition of the valve means allows fluid flow in the circuit in the event of failure or jamming of the drive means to allow reaction movement of the actuator means in response to load forces. Specifically, the rotary vane is fixed to an actuator shaft extending through the cylinder for coupling to the load to be actuated. In this embodiment, the position indicator means is operatively associated between the cylinder and the rotary shaft or actuator means.

In either embodiment, the valve means may be provided as a fully open valve to allow unrestricted flow of fluid in the circuit, or the valve means may include orifice means for damping flow of fluid in the circuit.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the FIGS. and in which:

DETAILED DESCRIPTION OF THE PREFERRED EMBODIMENT

Figure 1:
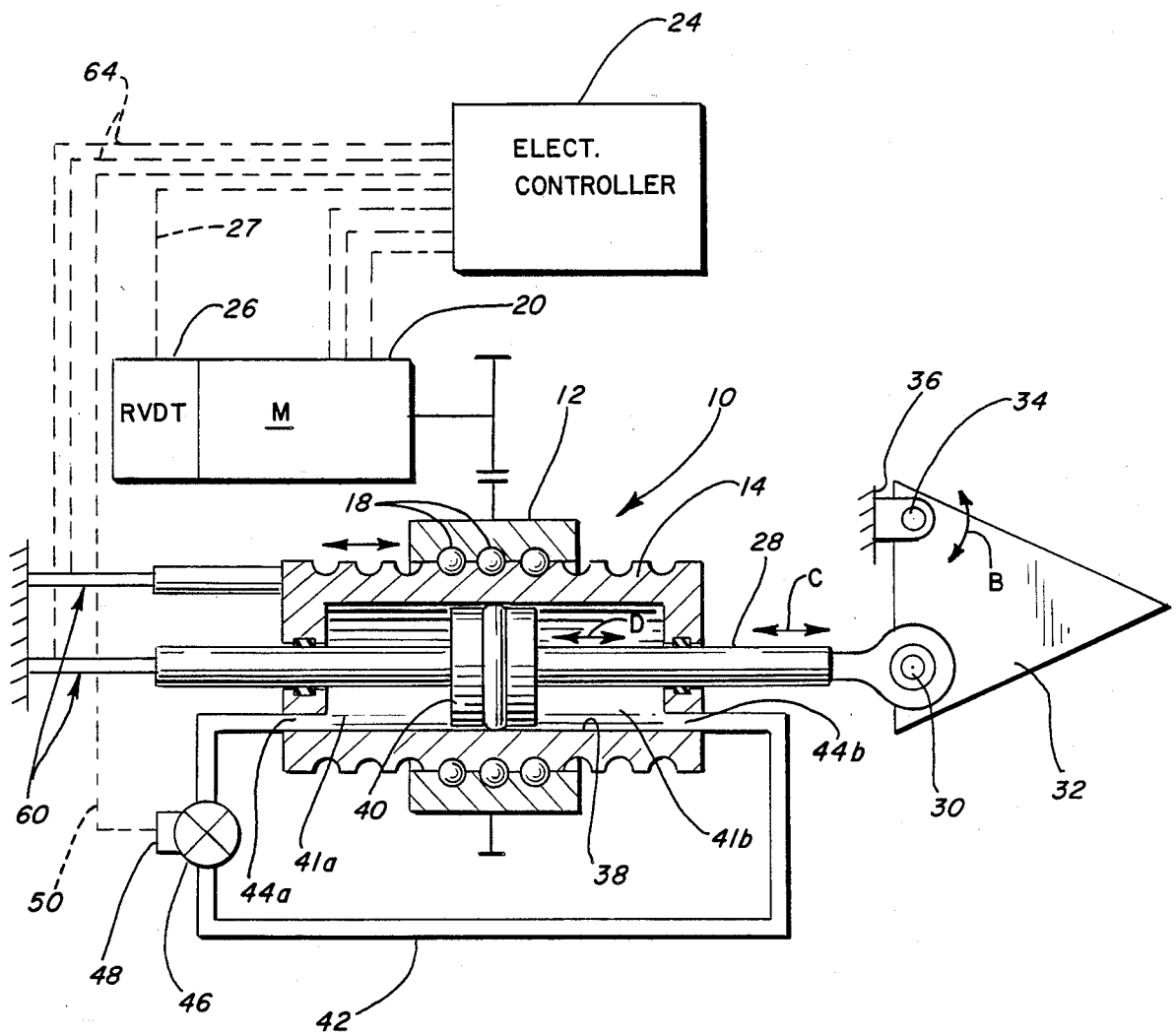
FIG. 1 is a somewhat schematic illustration of one embodiment of the non-jamming electro-mechanical hydrostatic actuator system of the invention.

The invention is useful for a wide range of applications such as a linear system or a rotary system illustrated in the drawings. FIGS. 1-4 show the invention in a linear actuation system including a ballscrew assembly. FIGS. 5-9 show the invention in a rotary actuation system including a rotary vaned assembly.

More particularly, referring to the embodiment of FIGS. 1-4, and first to FIG. 1, the linear system includes a ballscrew assembly, generally designated 10, having a rotatable nut 12 and an axially movable ballscrew 14 which is linearly movable in the direction of double-headed arrow "A" in response to rotational movement of nut 12, through the medium of balls 18.

Nut 12 of ballscrew assembly 10 comprises a driving member for the assembly and is, itself, driven by an electric motor 20 through a gear train 22. Electric motor 20 receives input power and command signals from an electronic controller 24. Power input and signal input is supplied to the controller. A rotary variable displacement transducer (RVDT) 26 may be operatively associated with motor 20 to feed back information, through line 27, to electronic controller 24 to indicate the position of the motor, i.e. in degrees.

Actuator means in the form of a rod 28 is pivotally connected, at 30, to a control surface 32 which, itself, is pivoted at 34 to ground 36 such as the fuselage or frame of an aircraft. Control surface 32 may comprise a rudder, a horizontal stabilizer, an aileron or other controlled surface of the craft. Actuator rod 28 pivots the control surface about pivot point 34 in the direction of double-headed arrow "B" in response to linear movement of actuator rod 28 in the direction of double-headed arrow "C".

In general, the invention contemplates hydraulic means coupled between ballscrew 14 and actuator means 28 to effect movement of the actuator means in response to movement of the ballscrew (i.e. arrows "A" and "C") as the hydraulic fluid within the hydraulic means comprises the driving link. This is effected by a static condition or connection within the hydraulic circuit, described hereinafter. The hydraulic means also is effective for selectively releasing the static connection in the event of failure in the system or jamming of the ballscrew assembly to allow relative movement between actuator means 28 and ballscrew 14 and, thereby, independent reaction movement of the actuator means in response to load forces on control surface 32.

More particularly, ballscrew 14 comprises a cylinder 38 within which a piston 40 is disposed for reciprocal motion in the direction of double-headed arrow "D". The piston is connected to or integral with actuator rod 28, as shown. The piston and cylinder assembly is a double-acting piston and cylinder device forming cylinder chambers 41a and 41b on opposite sides of the piston. A closed hydraulic circuit 42 is in communication, as at 44a and 44b, with cylinder 38 on opposite sides of piston 40. A selectively operable by-pass valve 46 is coupled in closed circuit 42, the valve being selectively opened and closed by a solenoid 48 coupled through line 50 back to electronic controller 24.

Therefore, with by-pass valve 46 in closed condition, closed circuit 42 statically traps fluid in the circuit and in chambers 41a and 41b of cylinder 38 on opposite sides of piston 40. In this static condition, the hydraulic fluid acts as a driving link whereby piston 40 and actuator rod 28 move with ballscrew 40 as a unit to actuate or move control surface 32.

Figure 2:
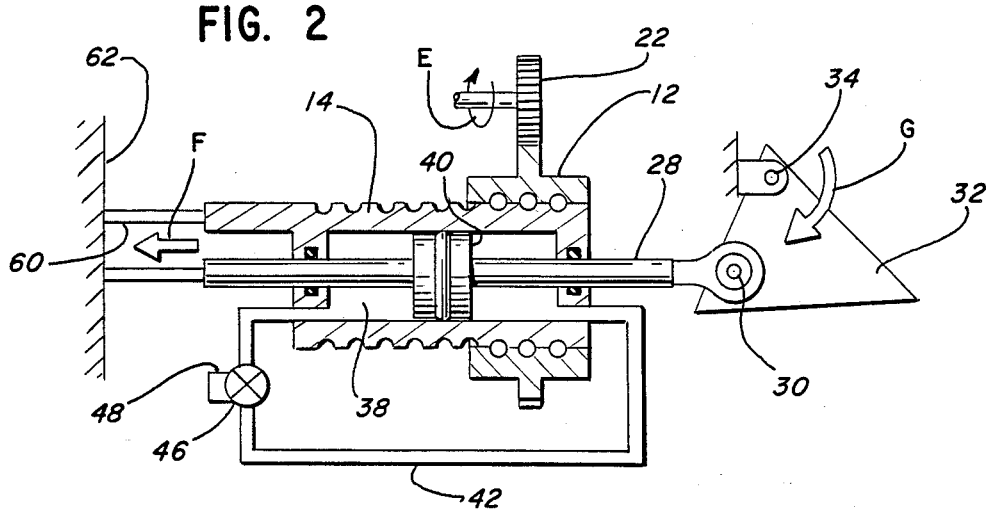
FIG. 2 is a somewhat schematic illustration of the components of the system shown in FIG. 1, with the control surface being actuated in a first direction.

For instance, it can be seen in FIG. 2, that rotation of gear 22 in the direction of arrow "E" causes ballscrew 14 to move in the direction of arrow "F". Such axial movement of the ballscrew carries piston 40 and actuator rod 28 therewith which results in pivoting of control surface 32 in the direction of arrow "G". This movement is effected by the aforesaid statically trapping of hydraulic fluid on opposite sides of piston 40 within cylinder 38.

Figure 3:
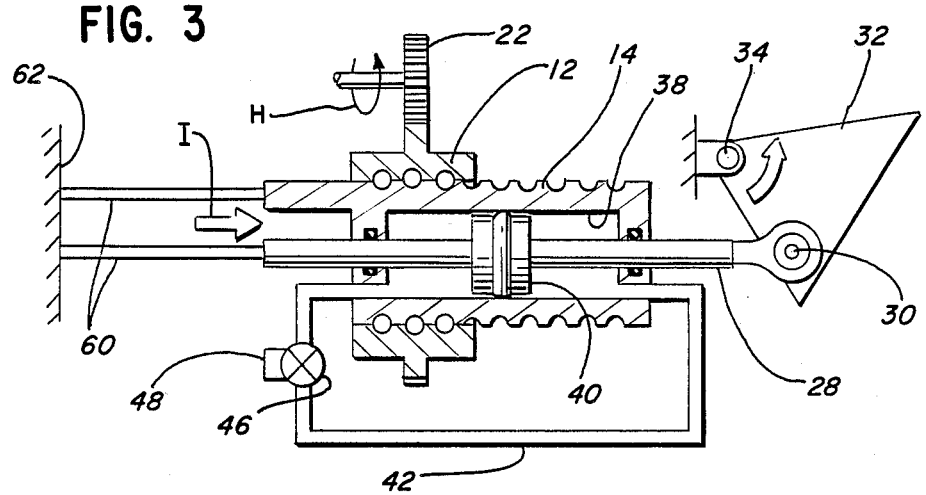
FIG. 3 is a view similar to that of FIG. 2, with the control surface being actuated in a second or opposite direction.

Conversely, referring to FIG. 3, rotation of gear 22 in the direction of arrow "H" causes ballscrew 14, piston 40 and actuator rod 28 to move in the direction of arrow "I" which, in turn, pivots control surface 32 in the direction of arrow "J", i.e. opposite the direction of movement of the components shown in FIG. 2. Again, this unitary movement is effected by the trapped fluid acting as a hydraulic driving link between the mechanical components of the ballscrew and the actuator means.

Figure 4:
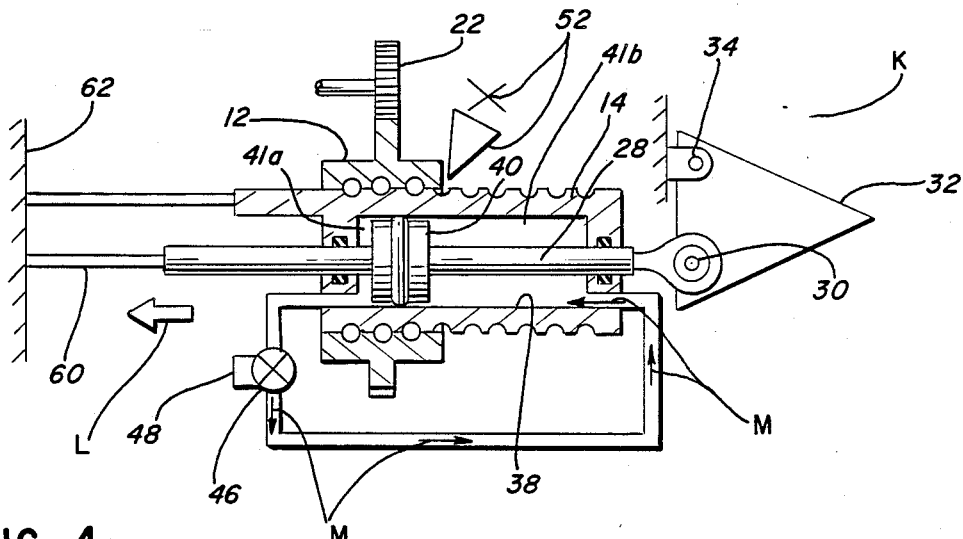
FIG. 4 is a view similar to that of FIG. 3, but illustrating a condition wherein the ballscrew has become jammed, and the closed hydraulic circuit has been opened to allow fluid flow in the circuit whereby the load forces can move the piston independently of the ballscrew.

In the event of jamming of the ballscrew operation, as indicated generally by symbols 52 in FIG. 4, closed hydraulic circuit 42 is selectively opened to allow flow of hydraulic fluid in the circuit and, thereby, allow reaction movement of actuator rod 28 and piston 40 independently of or relative to ballscrew 14 and cylinder 38 in response to load forces on control surface 32. Specifically, by-pass valve 46 is opened by solenoid 48 to release the static connection or static condition between ballscrew 14 and piston 40 as fluid now can flow between opposite sides of the piston, i.e. between cylinder chambers 41a and 41b. This is important so that control surface 32 is not jammed in an extreme position which would, obviously, cause critical safety problems. With by-pass valve 46 open to allow fluid flow in closed circuit 42, reaction loads, i.e. air loads in the direction of arrow "K" (FIG. 4); causes actuator rod 28 and piston 40 to move in the direction of arrow "L" independently of the jammed ballscrew 14. This enables the control surface to move naturally back to a "neutral" position under the influence of the air loads, as hydraulic fluid is moved within closed circuit 42 in the direction of arrows "M". Of course, if the ballscrew is jammed in the position of FIG. 2 versus the position of FIG. 3, the reaction airload would be opposite the direction of arrow "K" and the piston and actuator rod would be forced by the hydraulic fluid in the direction opposite arrow "L".

The above description concerns jamming of the ballscrew assembly, as indicated at 52 in FIG. 4. However, the same anti-jamming means and/or function is effected should a system failure or breakdown occur whereby motor 20, gear train 22 or other driving components fail. In these situations, a command signal simply is directed to solenoid-operated valve 46 to open the valve and allow the control surface to freely move. For instance, should there be a "commanded hardover" in the form of a loss of voltage or extremely high voltage which would create a condition to drive the ballscrew assembly beyond extreme limit positions, such a situation, when appropriately sensed, again could be rectified by releasing the static condition of the closed hydraulic circuit by opening valve 46.

By-pass valve 46 may comprise either an unrestricted flow valve or a metered or orifice type of valve. The unrestricted valve would allow substantially free flow of fluid and would be applicable in situations where a plurality of ballscrew assemblies are used to actuate a common control surface or the like. With unrestricted flow, the other ballscrew assemblies simply would become the dominant actuator means for moving the control surface. On the other hand, a metered or orifice type of valve would perform a shock absorbing function to allow the control surface to move to its neutral condition by more controlled movement.

Lastly, another feature of the invention is the provision of position indicators 60 which are shown coupled between ground 62 and ballscrew 14 and actuator rod 28. These position indicators may comprise linear variable displacement transducers coupled by lines 64 back to electronic controller 24 to detect failure to attain commanded position for opening valve 46. Therefore it should be understood that the use of the term "selectively" herein and in the claims hereof is intended to include automatic actuation in response to a predetermined sensed condition, such as jamming or other conditions as described. Lastly, by-pass valve 46 can be used as a centering valve to automatically compensate for internal fluid leakage and maintain the piston in the center of the ballscrew travel.

FIGS. 5–9 show the invention in a rotary actuation system, including a rotary vaned assembly, generally designated 68. The assembly includes a rotatable cylinder 70 journalled by bearings 72 appropriately grounded, as indicated. The cylinder forms a housing for a rotary vane structure 74 fixed to a shaft 76 projecting through opposite ends of cylinder 70. Seals 78 are provided about the shaft to prevent fluid leakage out of cylinder 70.

Cylinder 70 comprises a driving member for the rotary vaned assembly 68 and is, itself, driven by an electric motor 20' through a gear train 22' which includes a gear segment 80 fixed to the periphery of cylinder 70. As with the embodiment of FIG. 1, electric motor 20' receives input power and command signals from an electronic controller 24'. A rotary variable displacement transducer or resolver 26' may be operatively associated with motor 20' to feed back information, through line 27', to electronic controller 24' to indicate the position of the motor, i.e. in degrees.

Figure 5:
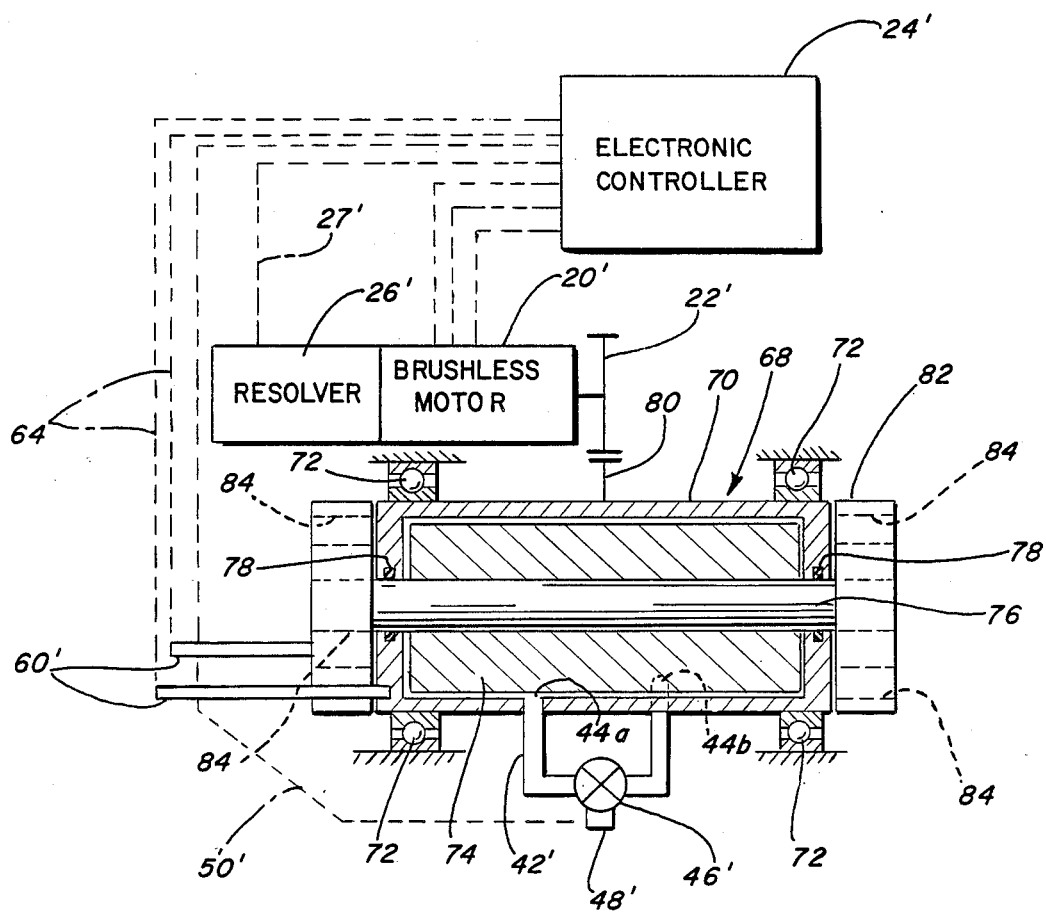
FIG. 5 is a somewhat schematic illustration of another embodiment of the non-jamming electromechanical hydrostatic actuator system of the invention.
Figure 6:
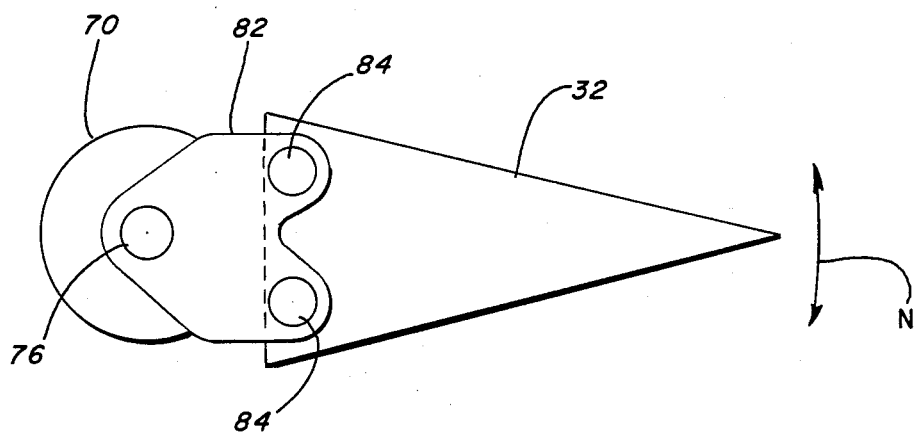
FIG. 6 is an end view of the actuator coupling means to the control surface in the embodiment of FIG. 5.

Referring to FIG. 6 in conjunction with FIG. 5, actuator means in the form of a coupling plate 82 is fixed to shaft 76 on the outside of cylinder 70, the shaft being fixed to rotary vane 74. Coupling plate 82 is connected to a control surface 32' by appropriate fastening means 84. FIG. 5 shows a pair of coupling plates 82 fixed to opposite ends of shaft 76 outside opposite ends of cylinder 70 for controlling either a pair of control surfaces or coupled conjointly to a single control surface. The control surface(s) may comprise a rudder, a horizontal stabilizer, an aileron or other controlled surface of the aircraft.

As seen in FIG. 5, as with the embodiment of FIGS. 1–4, a closed hydraulic circuit 42' is in communication, as at 44a' and 44b', with cylinder 70 on opposite sides of vane 74. A selectively operable by-pass valve 46' is coupled in closed circuit 42', the valve being selectively opened and closed by a solenoid 48' coupled through line 50' back to electronic controller 24'.

Therefore, with by-pass valve 46' in closed condition, closed circuit 42' statically traps fluid in the circuit and in cylinder 70 on opposite sides of vane 74. In this static condition, the hydraulic fluid acts as a driving link whereby vane 74, shaft 76 and coupling plate 82 move or rotate with cylinder 70 as a unit to actuate or move control surface 32' about the axis of shaft 76, as indicated by double-headed arrow "N" in FIG. 6.

Figure 7:
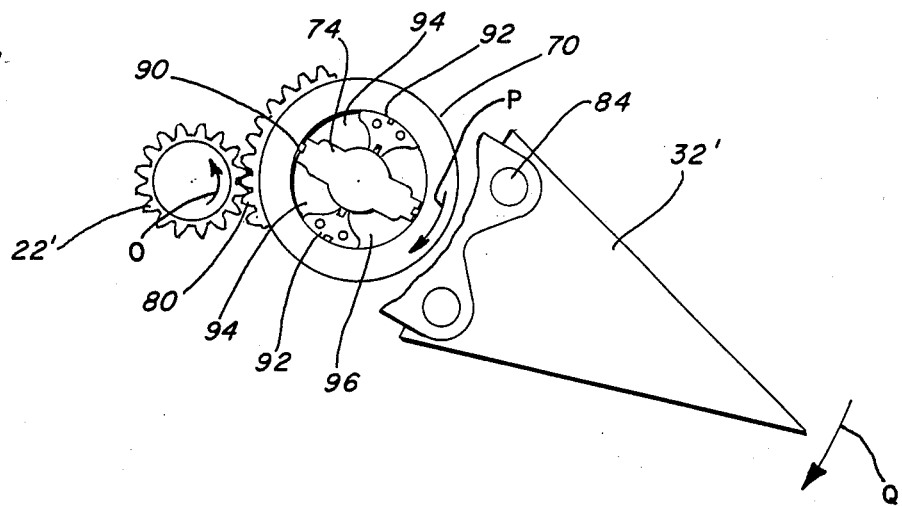
FIG. 7 is a somewhat schematic illustration of the components of the system of FIGS. 5 and 6, with the control surface being actuated in a first direction.

For instance, it can be seen in FIG. 7, that rotation of gear 22' in the direction of arrow "O", through gear segment 80, causes cylinder 70 to move or rotate in the direction of arrow "P". Such rotary movement of the cylinder carries vane 74 therewith which, as described above, results in pivoting or rotation of control surface 32' in the direction of arrow "Q". This movement is effected by the aforesaid statically trapping of hydraulic fluid on opposite sides of vane 74 within cylinder 70.

Figure 8:
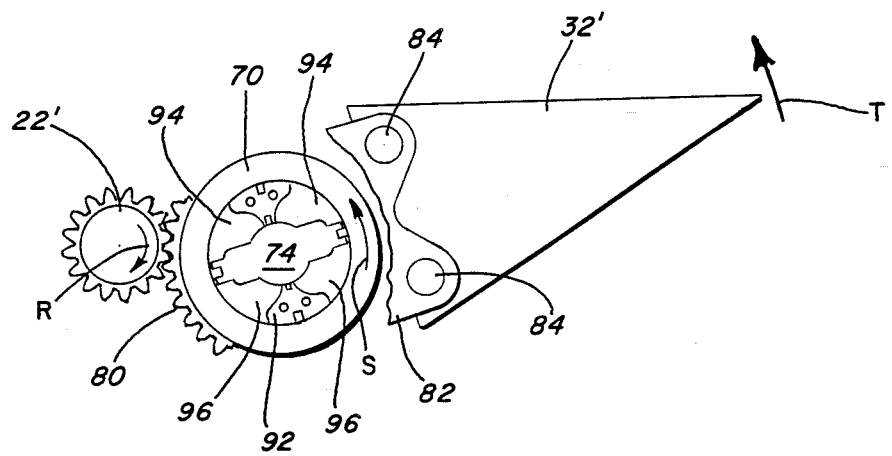
FIG. 8 is a view similar to that of FIG. 7, with the control surface being actuated in a second or opposite direction.

Conversely, referring to FIG. 8, rotation of gear 22' in the direction of arrow "R" causes cylinder 70, vane 74 and coupling plate 82 to rotate in the direction of arrow "S" which, in turn, pivots control surface 32' in the direction of arrow "T", i.e. opposite the direction of movement of the components shown in FIG. 7. Again, this unitary movement is effected by the trapped fluid acting as a hydraulic driving link between the mechanical components of the rotary vaned assembly.

It should be noted that FIGS. 7 and 8 show vane 74 to extend completely diametrically across the interior of cylinder 70, with seals 90 between the distal ends of the vane and the interior of the cylinder. Stationary stators 92 are fixed within cylinder 70 between the ends of the rotary vane. With this construction, hydraulic circuit 42' (FIG. 5) must be such that alternating conduits flow between each pair of chambers 94 and 96 on opposite sides of the vane ends.

Figure 9:
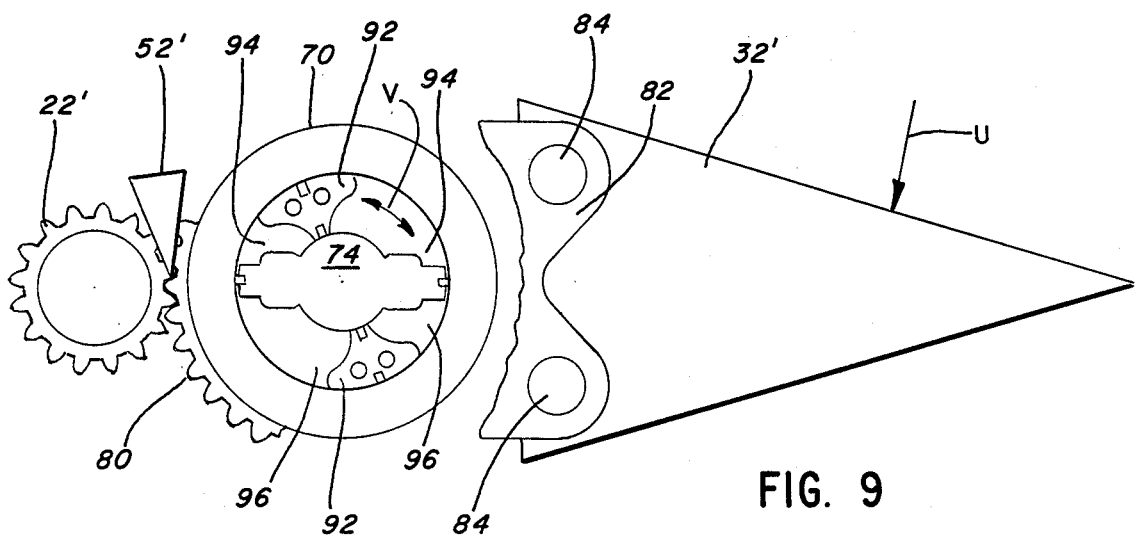
FIG. 9 is a view similar to that of FIG. 8, but illustrating a condition wherein the drive means and cylinder have become jammed, and the closed hydraulic circuit has been opened to allow fluid flow in the circuit whereby the load forces can move the vane independently of the cylinder.

In the event of jamming of the ballscrew operation, as indicated generally by symbol 52' in FIG. 9, closed hydraulic circuit 42' is selectively opened to allow flow of hydraulic fluid in the circuit and, thereby, allow reaction movement of vane 74, shaft 76, coupling plate 82 and control surface 32' independently of or relative to cylinder 70 and gear train 22' in response to load forces on control surface 32'. Specifically, by-pass valve 46' is opened by solenoid 48' to release the static connection or static condition between cylinder 70 and vane 74 as fluid now can flow between opposite sides of the vane ends, i.e. between cylinder chambers 94 and 96. Therefore, control surface 32' is not jammed in an extreme position because, with by-pass valve 46' open to allow fluid flow in the closed circuit, reaction loads, i.e. air loads in the direction of arrow "U" (FIG. 9), causes shaft 76 and vane 74 to move or rotate in the direction of arrow "V" independently of the jammed cylinder 70.

As with the initial description of the embodiment of FIGS. 1-4, the above description of the embodiment of FIGS. 5-9 concerns jamming of the ballscrew assembly, as indicated at 52' in FIG. 9. However, as with the first embodiment, the same anti-jamming means and/or function is effected should a system failure or breakdown occur whereby motor 20, gear train 22 or other driving components fail. Also as with the embodiment of FIGS. 1-4, by-pass valve 46' may comprise either an unrestricted flow valve or a metered or orifice type of valve. Furthermore, referring back to FIG. 5, position indicators 60' may be coupled by lines 64' back to electronic controller 24' to detect failure to attain commanded position for opening valve 46'. The position indicators are connected to cylinder 70 and one of the coupling plates 82 and may comprise rotary variable displacement transducers coupled by lines 64' back to the electronic controller.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A non-jamming actuator system, comprising:
    a ballscrew assembly including a rotatable nut and an axially movable ballscrew, said ballscrew having means thereon for cooperating with the nut and for producing axial movement of the ballscrew upon the nut being rotated, the ballscrew comprising a cylinder of a double-acting piston and cylinder device;
    drive means for rotating the nut;
    axially moveable actuator means operatively associated with a load to be actuated, the actuator means being coupled to a piston within a chamber defined by said cylinder,
    at least part of said cooperating means on said ballscrew axially overlapping said cylinder chamber; and
    a closed hydraulic circuit, including selectively operable valve means, communicating with the cylinder on opposite sides of the piston, whereby a closed condition of the valve means traps fluid in the circuit to effect movement of the actuator means in response to movement of the ballscrew and an open condition of the valve means allows fluid flow in the circuit in the event of failure or jamming of the ballscrew assembly to allow reaction movement of the actuator means in response to load forces.

2. The non-jamming actuator system of claim 1 wherein said valve means include full open means to allow unrestricted flow of fluid in the circuit.

3. The non-jamming actuator system of claim 1 wherein said valve means include orifice means for damping flow of fluid in the circuit.

4. The non-jamming actuator system of claim 1 including linear variable displacement indicator means coupled to the ballscrew and to the actuator means for indicating the relative axial positions thereof.

5. A non-jamming actuator system, comprising:
    a ballscrew assembly including a rotatable nut and an axially movable ballscrew,
    the ballscrew comprising a cylinder of a double-acting piston and cylinder device, defining a chamber for the double-acting piston, and having means thereon for cooperating with the nut and for producing relative axial movement between the ballscrew and nut as one of the nut and ballscrew is rotated relative to the other of the nut and ballscrew,
    at least part of said cooperating means on said ballscrew axially overlapping said cylinder chamber;
    drive means for rotating the one of the nut and the ballscrew to axially move the other of the nut and the ballscrew;
    axially movable actuator means operatively associated with a load to be actuated, the actuator means being coupled to a piston within said cylinder; and
    a closed hydraulic circuit, including selectively operable valve means, communicating with the cylinder on opposite dies of the piston, whereby a closed condition of the valve means traps fluid in the circuit to effect movement of the actuator means in response to movement of the other of the nut and the ballscrew and an open condition of the valve means allows fluid flow in the circuit in the event of failure or jamming of the ballscrew assembly to allow reaction movement of the actuator means in response to load forces.

6. The non-jamming actuator system of claim 5 wherein said valve means include full open means to allow unrestricted flow of fluid in the circuit.

7. The non-jamming actuator system of claim 5 wherein said valve means include orifice means for damping flow of fluid in the circuit.

8. The non-jamming actuator system of claim 5 including linear variable displacement indicator means coupled to the other of the nut and the ballscrew and to the actuator means for indicating the relative axial positions thereof.

9. The non-jamming actuator system of claim 5 wherein said nut surrounds the cylinder.

* * * * *